Dec. 20, 1955 J. HJORT 2,727,399
TRANSMISSION BELT
Filed May 19, 1953

INVENTOR.
JOHN HJORT
BY

United States Patent Office 2,727,399
Patented Dec. 20, 1955

2,727,399

TRANSMISSION BELT

John Hjort, Auburn, Mass., assignor to Henry L. Hanson Company, Worcester, Mass., a partnership Application May 19, 1953, Serial No. 355,960

1 Claim. (Cl. 74—231)

This invention relates to transmission belts and particularly power transmission and driving belts which are of the type commonly used for driving pulleys, shafts, spindles, etc.

The principal object of the present invention resides in the provision of such a belt which is made of a relatively inexpensive material which may be impregnated, such material for example being a woven fabric such as canvas, duck, or the like, said belt being provided with end portions having embedded therein belt hooks or similar belt fastening devices by which means a straight belt may be formed into an endless belt, in combination with a strong, flexible impregnating material which is used to impregnate the belt material adjacent said belt hooks, and may be processed therethrough from one side of the belt to the other, strengthening the same and building the belt up adjacent the belt hooks into relatively thick terminal belt portions, which taper down away from the exposed portions of the belt hooks in a direction towards the center of the belt, said taper being at its maximum adjacent the belt hook loops and about the size of the same, so that not only are the belt hooks held much more strongly to the belt than previously, but the belt hook loops are prevented by the reason of the tapering construction from contacting or impinging in any way on the pulleys or other devices which drive the belt or which are driven thereby.

Further objects of the invention reside in the provision of the belt as above described wherein the impregnating material is of a plastic rubbery nature which may be heated to a near liquid form and forced through the material of the belt; or the belt may be dipped in the material to form the same as above described; but in any event, the finished belt is provided with a rubbery flexible plastic thickened impregnated portion adjacent each end where the belt hooks are located.

Other objects and advantages of the invention will appear hereinafter.

Reference is to be had to the accompanying drawings, in which

In making the new belt forming the subject matter of this invention, any material which may be impregnated is used as a base material for the body of the belt. As a practical matter, this material will usually be woven, and as an example, a canvas or heavy duck material is suitable for the purpose, but it is to be emphasized that any material which is capable of impregnation may be used without departing from the scope of this invention.

Figure 1:
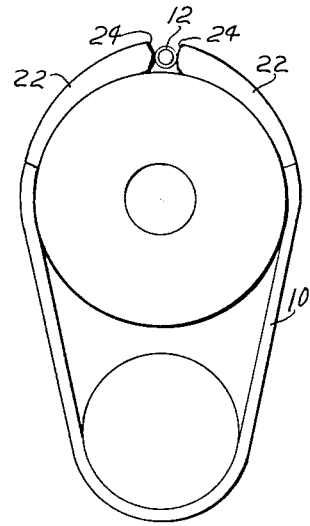
Fig. 1 illustrates a belt, the ends of which are connected, in association with a pulley.
Figure 2:
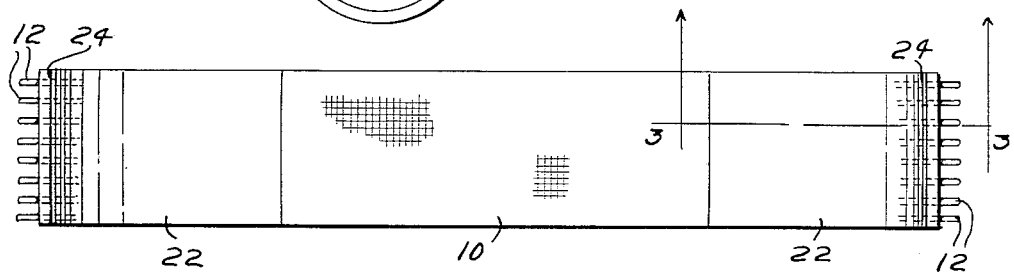
Fig. 2 is a plan view of the new belt.
Figure 3:
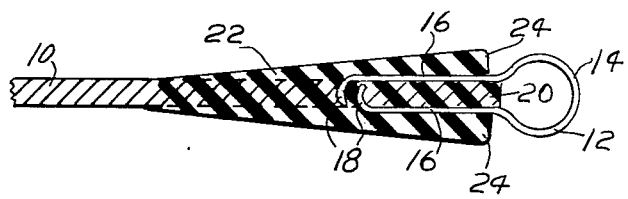
Fig. 3 is an enlarged section on the line 3—3 of Fig. 2.

This material is generally indicated in the drawing as at 10 and the belt hooks 12 which may be of usual form, are inserted in the usual way. These belt hooks provide loops 14, shanks 16 and hooks 18 by which the belt hooks are firmly fastened to the main portion of the belt 10. The belt material ordinarily extends just to the loops 14, as exemplified by the reference numeral 20 in Fig. 3. The loops 14 interfit and receive a pin to hold them together, as is well known in the art.

In carrying out the present invention, one form of applying the impregnated material is to provide a plastic material which may be softened under heat and pressure. The belt as above described is placed in position, and a predetermined amount of the plastic material is set thereon, heat and pressure is applied, and the plastic material is forced through the interstices of the belt material so as to appear as much at one side thereof as at the side upon which the pressure is originally applied. The plastic material used is preferably of a rubbery nature and it is tough, long-lasting and provides a high degree of friction.

It is to be understood that the impregnating material could also be applied by dipping, but where it is forced under pressure through the belt material, it forms a solid bond therewith and this in turn forms an extremely strong resultant material which holds the belt hooks with much greater strength than is possible without the new construction recited.

It is to be particularly noted that the impregnating plastic rubbery material indicated at 22 is formed on a taper with the greatest thickness adjacent the belt hook loops 14 as at 24. This construction forms shoulders adjacent the belt hook loops, which shoulders have a combined thickness normally greater than and when the belt is in use at least as great as the diameter of the belt hook loops measured in a plane normal to the working surface of the belt, so that as the belt travels on a pulley, the belt hooks do not touch the pulley. In this way the belt hooks are not damaged by the pulley or vice versa.

The side edges of the belt in the region of the impregnation are usually coated with the impregnating material during the process, so that a solid, tough end is produced at both ends of the belt.

It will be seen that this invention provides a new and improved transmission belt of the class described which is much longer-lasting than anything of the prior art, both as to prevention of extraction or disruption of the belt hooks and also as to prevention of damage to the belt hooks by means of the taper construction described.

Having thus described my invention and the advantages thereof, I do not wish to be limited to the details herein disclosed, otherwise than as set forth in the claim, but what I claim is:

A power transmission belt comprising a length of relatively thin, flexible, impregnatable woven fabric material, a soft rubbery impregnating material at each end portion of the belt penetrating through the belt and appearing in substantial thickness at both sides thereof, a belt fastening device located within each thickened end portion of the belt, the impregnated end portions being thicker than the belt fastening device measured in a plane normal to the working surface of the belt and of substantially greater thickness than the unimpregnated intermediate portion of the belt, said thickened end portions tapering gradually from the extremities of the belt to the unimpregnated intermediate portion.

References Cited in the file of this patent

UNITED STATES PATENTS

| 2,002,897 | Kremer | May 28, 1935 |
| 2,179,655 | Cutler | Nov. 14, 1939 |
| 2,183,546 | Colgrove | Dec. 19, 1939 |
| 2,228,926 | Matthaei | Jan. 14, 1941 |

FOREIGN PATENTS

| 421,295 | Great Britain | Dec. 18, 1934 |
| 661,032 | France | July 19, 1929 |